United States Patent
Nakamura et al.

(10) Patent No.: US 7,035,436 B2
(45) Date of Patent: Apr. 25, 2006

(54) METHOD OF GENERATING POSES AND MOTIONS OF A TREE STRUCTURE LINK SYSTEM

(75) Inventors: Yoshihiko Nakamura, Edogawa-Ku (JP); Katsu Yamane, Kawagoe (JP)

(73) Assignee: The University of Tokyo, Tokyo (JP)

( * ) Notice: Subject to any disclaimer, the term of this patent is extended or adjusted under 35 U.S.C. 154(b) by 588 days.

(21) Appl. No.: 10/212,102

(22) Filed: Aug. 6, 2002

(65) Prior Publication Data
US 2003/0034979 A1    Feb. 20, 2003

(30) Foreign Application Priority Data
Aug. 9, 2001    (JP)    ............... 2001-242435

(51) Int. Cl.
*G06K 9/00*    (2006.01)
(52) U.S. Cl. .................. 382/107; 73/488; 348/155
(58) Field of Classification Search ................ 382/103, 382/107, 122; 345/473, 474, 475; 352/50, 352/87; 348/97, 154, 155, 208.1, 208.2, 348/208.4, 208.13, 208.16, 353, 407.1, 413.1, 348/451, 452, 699, 700; 901/8; 73/488, 73/1.79
See application file for complete search history.

(56) References Cited

U.S. PATENT DOCUMENTS

| | | | |
|---|---|---|---|
| 5,889,532 A | 3/1999 | Boucher et al. | 345/424 |
| 5,966,141 A * | 10/1999 | Ito et al. | 345/473 |
| 6,088,042 A * | 7/2000 | Handelman et al. | 345/473 |
| 6,141,019 A * | 10/2000 | Roseborough et al. | 345/473 |
| 6,191,798 B1 * | 2/2001 | Handelman et al. | 345/473 |
| 6,326,971 B1 * | 12/2001 | Van Wieringen | 345/474 |

FOREIGN PATENT DOCUMENTS

| | | |
|---|---|---|
| JP | A 10-261108 | 9/1998 |
| JP | A 10-272878 | 10/1998 |
| JP | A 10-312469 | 11/1998 |
| JP | A 10-340354 | 12/1998 |
| KR | 2001-005780 | 7/2001 |

OTHER PUBLICATIONS

Takahashi, Takuya, "Challenge the Max2!!", Oct. 1998, Graphics World, pp. 128-131.
Katsutoshi Yagishita et al., "Precise Tracking by Scene and Image Constraints".
Yoshihiko Nakamura et al., "Dynamics Computation of Structure-Varying Kinematic Chains and Its Application to Human Figures", JRSJ vol. 16, No. 8, Nov. 1998, pp. 124-131.

(Continued)

*Primary Examiner*—Jingge Wu
*Assistant Examiner*—Abolfazl Tabatabai
(74) *Attorney, Agent, or Firm*—Oliff & Berridge, PLC

(57) ABSTRACT

A method of generating poses and motions of a tree structure link system that is made by modeling of a man, animals, robots, etc., and consists of multiple links connected at joints, characterized in that by giving arbitrary numbers of constraint conditions to arbitrary numbers of arbitrary links, or by allowing adding or canceling the constraint conditions arbitrarily in the middle of the generation, the poses and the motions of the tree structure link system satisfying these constraint conditions are generated.

8 Claims, 5 Drawing Sheets

OTHER PUBLICATIONS

Badler et al., "Multi-Dimensional Input Techniques and Articulated Figure Positioning by Multiple-Constraints," Proceedings of the 1986 Workshop on Interactive 3D Graphics, Chapel Hill, NC, USA, pp. 151-169, Oct. 23-24, 1986.

Maestri, "Digital Character Animation 2, vol. 1: Essential Techniques, Chapter 6, Skeletons and Mesh Deformation," New Riders Publishing, Indianapolis, USA, XP002263409, pp. 117-128, 1999.

Herda et al., "Skeleton-Based Motion Capture for Robust Reconstruction of Human Motion," Proc. Computer Animation, pp. 77-83, XP010526533, May 3, 2000.

Nakamura et al., "Inverse Kinematic Solutions With Singularity Robustness for Robot Manipulator Control, "Journal of Dynamic Systems, Measurement and Control, vol. 108, pp. 163-171, XP002107129, Sep. 1986.

* cited by examiner

◯ 3 degree of freedom spherical joint

▭ 1 degree of freedom joint

Twist angle range

Link direction range

METHOD OF GENERATING POSES AND MOTIONS OF A TREE STRUCTURE LINK SYSTEM

BACKGROUND OF THE INVENTION

1. Field of the Invention

This invention relates to a method of generating poses and motions of a tree structure link system that is made by modeling of a man, animals, robots, etc., and consists of multiple links connected at joints.

2. Relating Art Statement

A conventional technologies of generating data representing the motions of man, animals, etc. which appear in animations of CG, movie works, games, etc., and, data representing the motions of robots with many joints, such as humanoids, are published in documents;

[1] Choi, K. J and Ko, H. S.: "Online Motion Retargetting," the Journal of Visualization and Computer Animation, vol. 11, pp. 223–235, 2000,

[2] Gleicher, M. and Litwinowicz, P.: "Constraint-based Motion Adaptation," the Journal of Visualization and Computer Animation, vol. 9, pp. 65–94, 1998, and

[3] Lee, J. and Shin, S. Y.: "A Hierarchical Approach to Interactive Motion Editing for Human-like Figures, "Proceedings of SIGGRAPH '99, pp. 39–48, 1999, etc. All of these are technology of calculating the motion that satisfies constraint conditions that a leg is not slippery to the ground, etc. by optimization calculation in order to apply motion capture data obtained previously to various man type tree structure link systems that link length etc. differs mutually, or, to make a new motion, while the feature of the motion is saved.

In the technology described in the above-mentioned document [1], the motion is calculated so that each joint angle becomes a target value given, respectively, as much as possible closely while positions of end links are fixed. In the technology described in the above-mentioned document [2], the motion meeting the constraint conditions is calculated by performing large region-optimization so that the constraint conditions may become smooth over the whole motion. In the technology described in the above-mentioned document [3], by expressing the constraint conditions with hierarchical spline functions, it makes it possible to change some poses of a part of the body, while the constraint conditions are satisfied. The optimization calculation is performed for the whole motion like the technology of the reference [2].

For the technologies of the references [1], [2] and [3], a reference motion such as motion capture data is needed. Although the cost of the motion capture compared with the former is reduced and a library of the capture data is marketed increasingly, there are drawbacks that whenever the motion that is not included in the library is needed, the new motion has to be captured, the motions made from the same library tend to be similar, and, great time and great efforts are needed for correcting the motion as a wish.

For the technologies of the references [2] and [3], there is a drawback that since the large region optimization calculation is performed, it could not be applied to real time or interactive motion generation into which the input goes sequentially.

For the technology of the reference [1], there is a drawback that if the constraint condition is added to the link other than the end link, the calculation result may diverge. Moreover, there is another drawback that if it is going to fix many links, the solution may not be obtained.

The commercial CG software comprising an interface for specifying the positions of the end links of the link structure object in order to produce the animation has a drawback that the natural pose creation is difficult, since it can only calculate the joint angle of the partial link sequence equivalent to one branch of the tree structure link system such as an arm, a leg, etc., and cannot change the pose of the whole tree structure link system.

It can specify only the end link of the link sequence as the fixed link. This is for numerical computation to fail because inconsistency arises between each constraint when there is only a small number of joint between the multiple fixed links.

The movable range of the spherical joint is not taken into consideration with the conventional technologies.

SUMMARY OF THE INVENTION

It is an object of this invention to provide a method of generating poses and motions of a tree structure link system which overcomes the drawbacks of the above-mentioned conventional technologies, in order to generate man-like motions of the whole body for a human figure with multiple joints and multiple (for example, 20 or more) degrees of freedom on time by easy operation of specifying the orbit of one or more links even if there is no existing motion data such as motion capture data, or, in order to enable these to be corrected and reused by the operation when there is the motion data such as the motion capture data.

A method as claimed in claim 1 according to the invention is characterized in that by giving arbitrary numbers of constraint conditions to arbitrary numbers of arbitrary links, or by allowing adding or canceling the constraint conditions arbitrarily in the middle of the generation, the poses and the motions of the tree structure link system satisfying these constraint conditions are generated.

A method as claimed in claim 2 according to the invention is characterized in that the constraint conditions include the positions and poses of the links, and the velocities and angular velocities from which these change.

A method as claimed in claim 3 according to the invention is characterized in that the constraint conditions include that the joints do not exceed specified motion ranges respectively.

A method as claimed in claim 4 according to the invention is characterized in that the joints contain spherical joints with 3-degree of freedom, and the spherical joints are made not to exceed their motion ranges by using a method of expressing the motion ranges intuitively.

A method as claimed in claim 5 according to the invention is characterized in that the constraint conditions include that the joint value and the joint velocity of the joint with all or a part of degrees of freedom are approached the given target joint value and the given target joint velocity as much as possible.

A method as claimed in claim 6 according to the invention is characterized in that the constraint conditions are realized by considering a restoring force depending on an error with an ideal state for each constraint condition.

A method as claimed in claim 7 according to the invention is characterized in that priorities are set to the constraint conditions respectively.

A method as claimed in claim 8 according to the invention is characterized in that an inverse kinetic calculation is used to generate the poses of the tree structure link system, the demand of strictness or the relief of strictness depending on the priority of the constraint conditions are permitted to the solution of the reverse kinematics calculation, and, a singular point low sensitivity motion decomposing method is used to solve the singular point problem of the solution.

A method as claimed in claim 9 according to the invention is characterized in that if the tree structure link system has an existing motion data, the constraint condition is added to or released from the motioning link by an operation during the motion.

According to the invention,
even if there is no movement data such as motion capture data, the motion can be generated only by calculation,
the existing motion data can be also processed, since the optimization covering the whole motion is not performed, the motion can be generated while receiving an input on real time, and,
by specifying the orbit of the link, for example, the motion such as an object is moved from a certain position to another position can be realized easily.

According to the method as claimed in claim 2, by setting the fixed link, the generation of the motion when constrained by contact etc. in the environment becomes easy.

According to the method as claimed in claims 3 or 4, by setting the joint movable range, it can prevent becoming the poses which have not been made into a man, animals, robots, etc. Moreover, the hardness and softness of the body can be adjusted.

According to the method as claimed in claim 5, the generation of the motion to which a certain existing motion was changed a little, or, the periodic motion becomes easy.

According to the method as claimed in claim 6, various constraints can be realized now only by the local information, and the generation of the real time interactive motion becomes possible.

According to the method as claimed in claims 7 or 8, arbitrary numbers of the constraint conditions can be set to arbitrary positions, and even if these are contradictory, the appropriate motion can be calculated according to the priority set previously.

According to the method as claimed in claim 9, if the motion data already exists, a new motion can be made based on it by the same operation.

As the field to which this invention is applicable, the generation of animations of CG, movie works, games, and the operation of the humanoid etc. can be considered. Also in which field, except for using as independent software, using as a calculation engine of software comprising any graphical interface, and a plug-in of the existing CG software is also possible.

It is important to become the same pose for every cycle in periodic motion of walking motion etc. This is also realized by introduction of the target joint value. By setting the target joint value, if the orbit of the motion of the link that is given the constraint condition is periodic, the motion of the whole body also becomes periodic.

Considering above effects, the natural motion of the whole body of the model of the tree structure link system, such as a man, animals, robots, etc. which is obtained only when the skilled professional animator makes applying many time and labors or the motion of the actual man or animals is captured using expensive equipments conventionally, can be created now by the operation with easy anyone. Moreover, since the generation of the motion on real time is possible, it can be used as the calculation engine for generating various motions depending on to the situation, for the field of which high interactivity is required, for example, games.

In the field of robotics, this invention is applicable as an intuitive interface for operating a robot with many joints, such as a humanoid. Since such a robot has many variables that must be operated, only what is limited, such as directing the direction along which it walks is realized until now as the interface for performing the interactive operation. According to the invention, various motions can be directed now to the robot in many situations.

Moreover, two or more key frames can also be generated by the above-mentioned method of generating poses and motions of a tree structure link system according to the invention. Therefore, this invention relates also to a method of generating a series of motions of a tree structure link system by the interpolation operation between the key frames, such as key frame animations.

DESCRIPTION OF THE PREFERRED EMBODIMENTS

Figure 1:
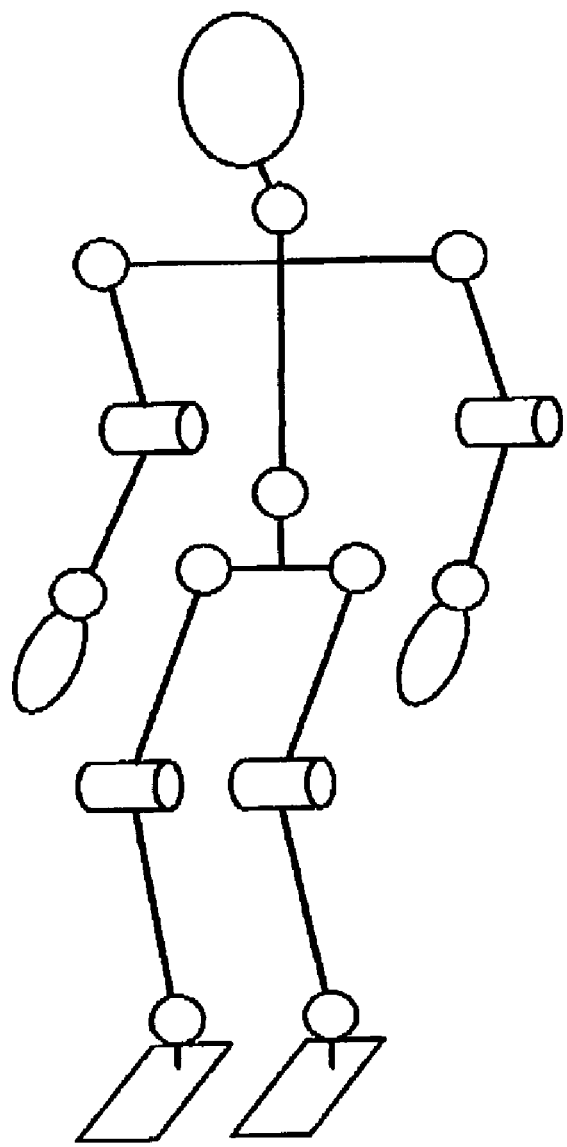
FIG. 1 shows an example of a human figure to which motion data is generated by the method of generating motion data according to the invention.

FIG. 1 shows an example of a model that can be applied by the method of generating poses and motions of a tree structure link system according to the invention. This man type tree structure link system model is, for example, a man who appears in the computer graphics, or the model used for the intuitive interface for operating the robot with many joints, such as a humanoid. In this model, multiple links are connected at multiple spherical joints with 3-degree of freedom and multiple revolute joints with 1-degree of freedom.

Figure 2:
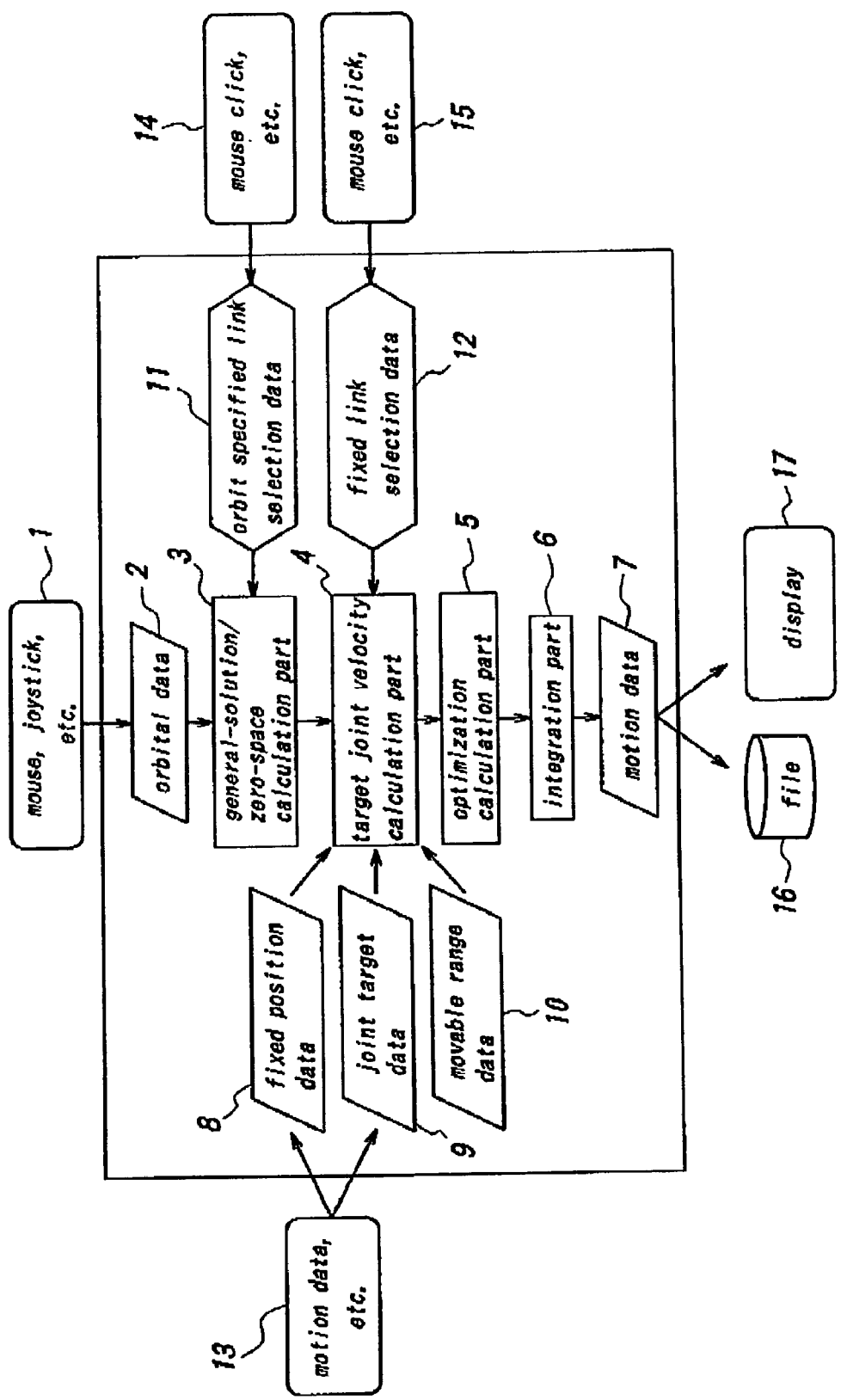
FIG. 2 shows a flowchart of a program realizing the method of generating motion data according to the invention.

The system for performing the method of generating motion data according to the invention can be implemented as a calculation engine or a plug-in that is called from independent software that is performed on a computer, or another software. FIG. 2 shows a flow chart of the method of generating motion data according to the invention. Although an example of the interface for each input and output and operation from outside is also included in this figure as reference, the range of the invention is a portion surrounded by the thick line.

The system for performing the method of generating motion data according to the invention complies a general solution/zero-space calculation part 3, a target joint velocity calculation part 4, an optimization calculation part 5 and an integration part 6

By clicking of a mouse that is an external interface, etc. (14, 15), the link to change its orbit and the link to fix all over space in the tree structure link system displayed on a display (not shown) are selected, and then an orbit specified link selection data 11 and a fixed link selection-data 12 are inputted. These links can also be changed during the real time generation of subsequent data. The orbit specified link selection data 11 is inputted into the general-solution/zero-space calculation part 3. Then, an orbital data (2) of the link selected as the link to change its is inputted into the general-solution/zero-space calculation part 3 by moving (1) of the mouse, a joy stick, etc. which are the external interface. The general-solution/zero-space calculation part 3 calculates a general solution of the joint velocity at which the link that is specified its orbit moves on the orbit, and, a space (zero-space) in which the joint velocity can be changed without affecting the orbit of the link, the calculation result of the general solution of the joint velocity is supplied to the target joint velocity calculation part 4, and the calculation result of the zero space is supplied to the optimization calculation part 5.

The fixed link selection data 12 is also inputted into the target joint velocity calculation part 4. Furthermore, the position data (the fixed position data 8) of the link to fix is inputted from the existing motion data by using, for example, the link position (13) in the existing motion data etc. (13). Furthermore, a joint target data 9 that is the target value of each joint is inputted. As this data, the joint value (13) in the existing motion data may be used. Furthermore, the movable range of each joint is inputted. The target joint velocity calculation part 4 which received the above-mentioned data calculates errors with the ideal states from the present position and the present joint angle of the link to fix respectively, calculates the target joint velocity which feeds these errors back, and, inputs the result into the optimization calculation part 5.

The optimization calculation part 5 which received the calculation result of the target joint velocity, calculates an optimal joint velocity possible near the target joint velocity calculated in the target joint velocity calculation part 4 in the zero space calculated in the general-solution/zero-space calculation part 3, and supplies the result to the integration part 6.

The integration part 6 integrates the obtained joint velocity to obtain the joint value data. The motion data containing the time series data of the joint value and the time series data of the link position is outputted as output data for storing into the external file 16 or displaying graphically on the screen 17.

A procedure of the actual motion generation is as follows;
all the links (a, b, c) to fix in space are chosen;
the link (p) to specified its orbit in real time is chosen;
if required, the joint movable range is set suitably; and
when the motion is already given, while reproducing it, the orbit to be specified to the link p to specify its orbit is inputted by the suitable interface. In addition, at this time, the positions of each time in the original motion are given to the links a, b, and c to fix in space as the positions to be fix, and the joint values of each time in the original motion are given as the joint target values.

The motion generated at this time is so as to satisfy all or a part of two or more constraints in which arbitrary number of links are fixed at the specified positions in space (it contains the case that the specified positions vary with time), the joint angle approaches the target value as much as possible (it contains the case that the target value varies with time), and, the joint does not deviate from the movable range, etc. However, the constraint conditions are not necessarily limited to these three kinds, and if they are the constraint conditions that can be expressed in the same form, they are incorporable without limit.

Figure 3:
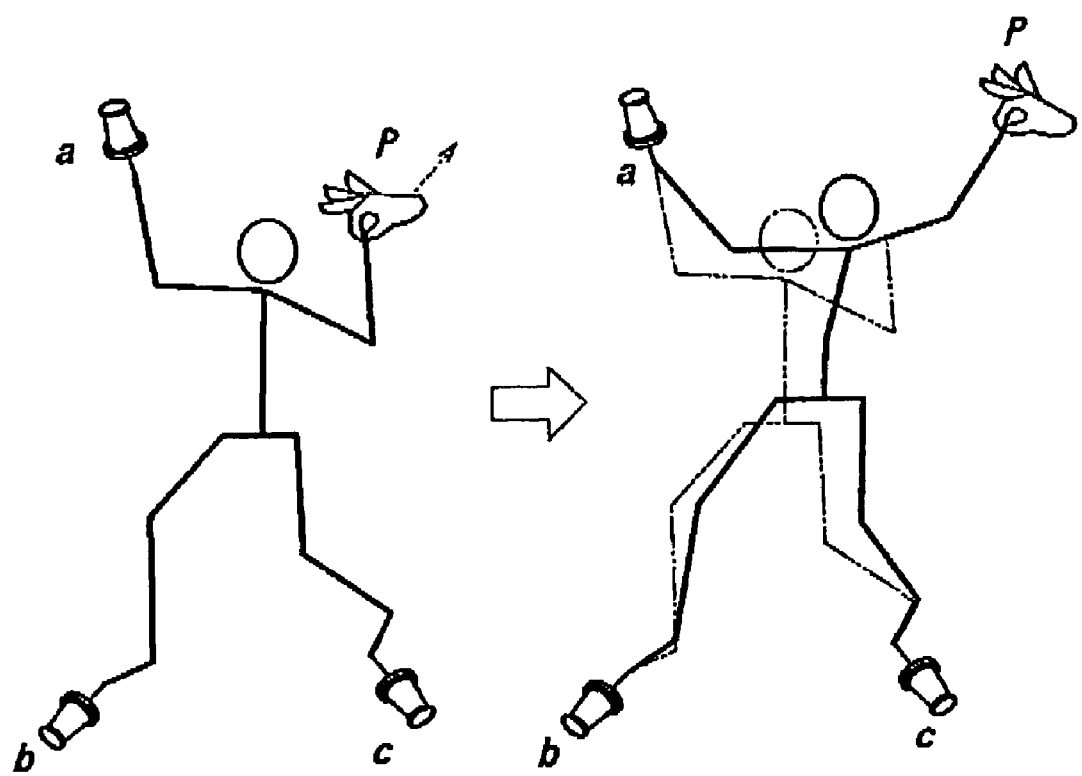
FIG. 3 shows how the method of generating motion data according to the invention is applied to the human figure.

Next, the more concrete embodiment of this invention is explained. According to the motion generation software making use of this invention, if the user chooses suitably the link to specify its orbit and the link to fix its position, and, gives the orbit and the position respectively, the optimal motion in consideration of the target joint value, the joint movable range, etc. is calculated every moment. FIG. 3 shows an example of the interface in such motion generation software. Such an interface is called a pin/drag interface. A fundamental function of this interface is that while fixing (pinning) some of the links shown by a, b, c, and p in space, the other links are moved as the user directed (dragged).

An aim of the motion generation by the pin/drag is generation of following motions;

(1) the dragged link moves on the specified orbit, (2) the pinned link is fixed at the specified position, (3) each joint does not deviate from the movable range, and (4) each joint value approaches the given target value as much as possible.

This corresponds to the reverse kinematics calculation to which the many constraint conditions are imposed, and, it is clearly unreal to solve this analytically. Moreover, the strict solution may not exist because of inconsistency between each constraint condition. For example, if the link is dragged out of the movable range that is decided by the pinned position, the solution that satisfies the conditions (1) and (2) simultaneously does not exist.

In an embodiment of method according to this invention, first, a numerical solution method making use of the Jacobian is applied to the reverse kinematics problem. Furthermore, in order to cope with the inconsistency between the constraint conditions, the four constraint conditions am divided by two steps of priorities. A higher priority is given to the constraint conditions (1) concerning the dragged link among the four constraint conditions mentioned above, and, a solution which satisfies other three constraint conditions as much as possible in the zero space in which the constraint condition (1) is not affected is looked for. Therefore, if the constraint condition (1) is inconsistent with the other constraint conditions, priority is given to the constraint condition (1), and the others are disregarded.

In order to cope with a case where inconsistency is between the constraint conditions (2)–(4), i.e. the matrix of which the rank decreased appears when looking for the optimal solution in the zero space of the constraint condition (1), the singular point low sensitivity motion decomposition matrix (SR-Inverse) (please refer to Nakamura and Hanafusa, "singular point low sensitivity motion decomposition of a joint form robot arm" Society of Instrument and Control Engineers papers, 453–459 pages, 1984) which does not take out an extremely large solution by allowing an error also near a singular point is used. Thereby, any numbers of the pins, any movable ranges, and any target values can be given, and, since if inconsistency is among these, the error is distributed depending upon pre-given weights, an unnatural motion is not outputted. Moreover, the controller that feeds back the error generated by using SR-inverse is incorporated so that if the inconsistency is canceled, it may return to the pose in which the constraint conditions are satisfied.

The Jacobian of the position of the link i concerning the joint value of the tree structure link system is defined as follows;

$$J_i \equiv \frac{\partial r_i}{\partial \theta} \quad (1)$$

where $r_i$ is the position of the link i, $\theta$ is a vector which put the joint values of the tree structure link system in order, and, $J_i$ is the Jacobian of the position of the link i about $\theta$. For the method of calculating this Jacobian efficiently, please refer to, for example, D. E. Orin and W. W. Schrader, "Efficient Computation of the Jacobian for Robot Manipulators" International Journal of Robotics Research, vol.3, No.4, pp. 66–75, 1987. The relation between the velocity of the link i and the joint velocity is expressed by using the Jacobian as follows;

$$\dot{r}_i = J_i \dot{\theta} \quad (2).$$

The link that is a standard for numbering each link of tree structure link systems such as a man, animals, robots, etc. is called a route link. If the route link is not being fixed to the inertial coordinate system, it's translation velocity and angular velocity are also contained in $\dot{\theta}$. If $J_i$ is a square regular matrix, the joint velocity can be obtained from the velocity of the link i by following equation;

$$\dot{\theta} = J_i^{-1} \dot{r}_i \quad (3).$$

However, since the tree structure link systems such as a man, animals, robot, etc. usually have 30 or more degrees of freedom, $J_i$ is not square and has redundancy. In this case, the general solution of the equation (2) is expressed by using a pseudoinverse matrix $J_i^\#$ as follows;

$$\dot{\theta} = J_i^\# \dot{r}_i + (E - J_i^\# J_i) y \quad (4)$$

where E is a unit matrix and y is an arbitrary vector. The second term of the right-hand side of the equation (4) represents the zero space by redundancy, and, using this the solution which satisfies the other constraint conditions without changing the velocity of the link i can be looked for.

Hereinafter, a calculation for generation of motions in an embodiment of the method according to this invention is explained. First, the general solution of the joint velocity at which the dragged link can be moved to the specified position is calculated. The general solution of $\dot{\theta}$ to which the dragged link follows the position $r_p^{ref}$ and the velocity $\dot{r}_p^{ref}$ of the specified orbit is calculated. If $r_p$ is the present position of the dragged link, the target velocity in consideration of feedback is calculated by the following equation;

$$\dot{r}_p^{ref} = \dot{r}_p^{ref} + K_p (r_p^{ref} - r_p) \quad (5)$$

where $K_p$ is a positive definite gain matrix. A relation between $\dot{\theta}$ and $\dot{r}_p$ is expressed by using the Jacobian $J_p$ concerning the joint value of the link position to drag as follows;

$$\dot{r}_p = J_p \dot{\theta} \quad (6).$$

The general solution of the joint velocity $\dot{\theta}$ which realizes the target velocity $r_p^d$ is calculated by a following equation;

$$\dot{\theta} = J_p^\# \dot{r}_p^d + (E - J_p^\# J_p) y \quad (7).$$

Feedback control is performed for compensating an integration error here. Moreover, if a weighted pseudoinverse matrix is used instead of the normal pseudoinverse matrix, "hardness" i.e., an ease of moving and a difficulty of moving of each joint can be adjusted.

Calculations concerning the other constraints are explained. The equation (7) is rewritten as;

$$\dot{\theta} = \dot{\theta}_0 + W y \quad (8)$$

where $W \equiv E - J_p^\# J_p$ and $\dot{\theta}_0 \equiv J_p^\# \dot{r}_p^d$. It is assumed that there are the $N_F$ pinned links, and, these positions are expressed by $r_{Fi}$ (i=1, ..., $N_F$). Moreover, it is assumed that there are the $N_D$ links which are given the target joint values, and, these target joint values are expressed by $\theta_D$. It is assumed that the $N_L$ joints exceed the movable ranges, and, these Joint values are expressed by $\theta_L$. $N_L$ may change during the motion anytime. A vector $p_{aux}$ is defined by using these as follows;

$$p_{aux} \equiv (r_{F1}^T \ldots r_{FNF}^T \theta_D^T \theta_L^T)^T \quad (9).$$

The following relation between $\dot{r}_{aux}$ and the joint velocity $\dot{\theta}$ are like the equation (2);

$$\dot{p}_{aux} = J_{aux} \dot{\theta} \quad (10).$$

The calculation of $J_{aux}$ is mentioned later. The arbitrary vector y is calculated as follows. First, the target velocity $p_{aux}^d$ of $p_{aux}$ is calculated by a method mentioned later. The equation (8) is substituted into the equation (10) to obtain a result;

$$\dot{p}_{aux} = \dot{p}_{aux}^0 + J_{aux} W y \quad (11)$$

where $\dot{p}_{aux}^0 \equiv J_{aux} \dot{\theta}_0$. $S \equiv J_{aux} W y$ and $\Delta \dot{p}_{aux} \equiv \dot{p}_{aux}^d - \dot{p}_{aux}^0$ are applied to modify the equation (11) to a following simple form equation;

$$Sy = \Delta \dot{p}_{aux} \quad (12)$$

Since S is not necessarily a full rank, the SR-inverse is applied in order to solve this equation. If the SR-inverse of S is expressed as $S^*$, y is calculated as;

$$y = S^* \Delta \dot{p}_{aux} \quad (13)$$

The joint velocity $\dot{\theta}$ is obtained by substituting the equation (13) into the equation (8), and the joint angle data of each flame is obtained by integrating it.

The calculation of $J_{aux}$ mentioned above is explained. If the Jacobian concerning the joint value of $r_{Fi}$ is expressed with $J_{Fi}$(i=1, ..., $N_F$), for the all pinned links, it is held as follows;

$$\dot{r}_{Fi} = J_{Fi} \dot{\theta} \quad (14).$$

For the joint to which the target joint value is given, the relation between its velocities $\dot{\theta}$ and $\dot{\theta}_D$ is expressed as follows;

$$\dot{\theta}_D = J_D \dot{\theta} \quad (15)$$

where $J_D$ is a matrix that if the i-th joint of $\theta_D$ corresponds to the j-th joint of $\theta$, then the (i, j)-th element is 1, if not 0. Similarly, the relation between $\dot{\theta}$ and the velocity of $\theta_L$ is expressed as $$\dot{\theta}_L = J_L \dot{\theta} \quad (16)$$

where $J_L$ is a matrix that if the i-th joint of $\theta_L$ corresponds to the j-th joint of $\theta$, then (i, j)-th element is 1, if not, 0. Summarizing the above matrices, $J_{aux}$ becomes as follows;

$$J_{aux} = \begin{pmatrix} J_{Fi} \\ \vdots \\ J_{FNF} \\ J_D \\ J_L \end{pmatrix} \quad (17)$$

For a part corresponding to the spherical joint of $J_{Fi}$, $J_D$, and $J_L$, it mentions later.

The calculation of $p_{aux}^d$ mentioned above is explained. The target velocity $\dot{r}_{Fi}^d$ of the pinned link is calculated by following equation;

$$\dot{r}_{Fi}^d = K_{Fi}(r_{Fi}^{ref} - r_{Fi}) \quad (18)$$

where $r_{Fi}^{ref}$ is the position of the pin and $K_{Fi}$ is a positive definite gain matrix. The target velocity $\dot{\theta}_D^d$ of the joint that is given the target joint value is calculated as;

$$\dot{\theta}_D^d = K_D(\theta_D^{ref} - \theta_D) \quad (19)$$

where $\theta_D^{ref}$ is a vector to which the target joint values are arranged and $K_D$ is a positive definite gain matrix. The target velocity of the joint that exceeds the movable range is calculated as follows;

$$\dot{\theta}_{Li}^d = \begin{cases} K_{Li}(\theta_{Li}^{max} - \theta_{Li}) & \text{if } (\theta_{Li} > \theta_{Li}^{max}) \\ K_{Li}(\theta_{Li}^{min} - \theta_{Li}) & \text{if } (\theta_{Li} < \theta_{Li}^{min}) \end{cases} \quad (20)$$

where $\theta_{Li}^{max}$ and $\theta_{Li}^{min}$ are a maximum value and a minimum value of the joint angle respectively, and $K_{Li}$ is a positive gain. The equations (19) and (20) are applicable only to the 1 degree of freedom joint. Processing of the spherical joint is described below.

First, the target joint value of the spherical joint is explained. The joint value $R_i$ and the joint velocity $\omega_i$ are defined by a 3×3 rotation matrix and its angular velocity respectively When the spherical joint is given the target joint value $R_{Di} \in R^{3 \times 3}$, the target velocity is obtained as follows. First, an error vector $e_i$ is calculated as;

$$e_i = \frac{1}{2} \begin{pmatrix} \Delta R_i(1,2) - \Delta R_i(2,3) \\ \Delta R_i(1,3) - \Delta R_i(3,1) \\ \Delta R_i(2,1) - \Delta R_i(3,2) \end{pmatrix} \quad (21)$$

$$\Delta R_i = R_{Di} R_i^T \quad (22)$$

where $\Delta R_i(m,n)$ is the (m,n)-th element of $\Delta R_i$. Subsequently, the target angular velocity $\omega_{Di}^d$ is calculated as;

$$\omega_{Di}^d = -K_{Di} e_i \quad (23)$$

where $K_{Di}$ is a positive definite gain matrix. For the spherical joint, the equations (21)–(23) are used instead of the equation (19). The Jacobian which becomes a part of $J_{Fi}$, $J_D$, and JL corresponding to the spherical joint consists of three columns, and each column corresponds to rotation around x, y and z respectively. Each column is calculable like the rotation joint centering on the corresponding direction, respectively.

Figure 4:
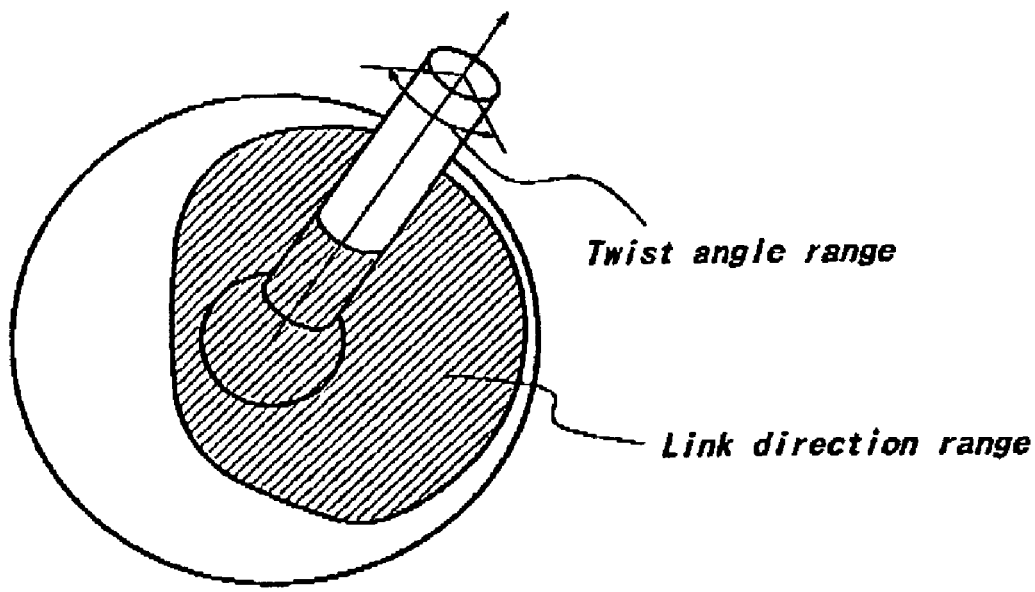
FIG. 4 shows a joint movable range of a spherical joint.
Figure 5:
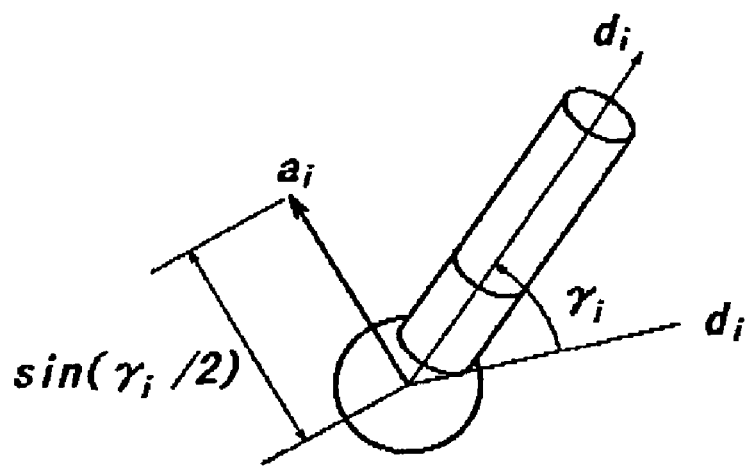
FIG. 5 shows diagrammatically link parameters of the spherical joint.
Figure 6:
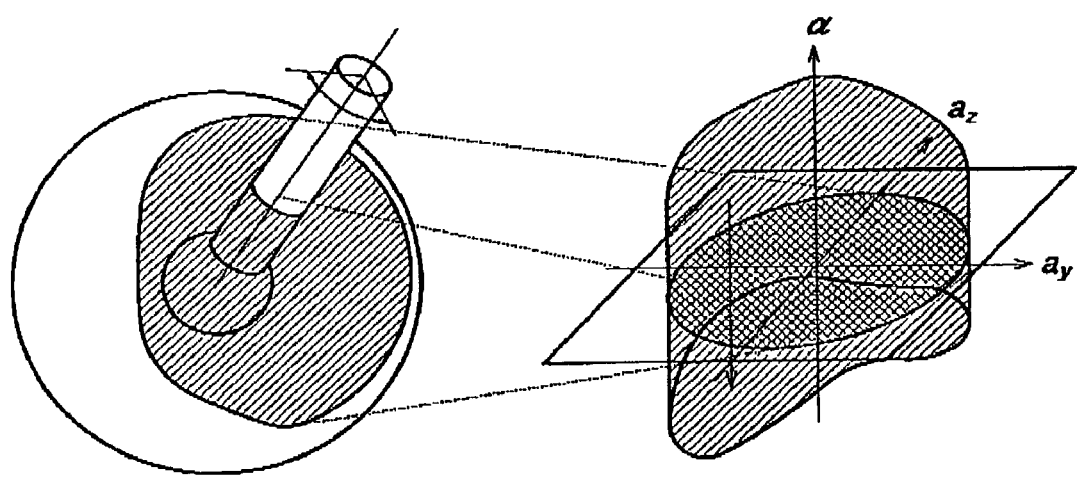
FIG. 6 shows the joint movable range of the spherical joint projected to $(a_y, a_z, \alpha)$ space.

Next, the joint movable range of the spherical joint is explained. Since the spherical joint has 3 degree of freedom, the movable range is expressed as a domain in 3-dimensional space. Although there are various methods for expressing the pose, it is important to choose a suitable method for improvement in calculation speed. For example, if the Eulerian angle often used is used for pose expression, the movable range become a very complicated form because of nonlinearity, and calculation speed falls as a result. Here, it is described how to express the movable range of the spherical joint so that it may be easy to understand intuitively. As shown in FIG. 4, the movable range of the spherical joint is expressed using a total of three parameters containing two parameters representing the direction of the link and one parameter representing the twist angle of the link. The direction of the link when $R_i$ is a unit matrix is expressed with a unit vector $d_i^0$. The actual direction $d_i$ of the link is obtained by rotating $d_i^0$ around a vector $a_i$ contained in a plane perpendicular to $d_i^0$ as shown in FIG. 5. The length of $a_i$ is $\sin(\gamma_i/2)$ where the rotation angle is $\gamma_i$. The twist angle $\alpha$ is defined as the rotation angle required in order to make to coincident $R_i$ with the frame which is obtained by rotating $R_i$ around $a_i$ from the state of a unit matrix. Considering the circumstances mentioned above, all the poses that can be taken by the spherical joint are included in a cylindrical shape whose radius is 1 and height is $2\pi$ centering on $d_i^0$. In this embodiment, it is assumed that for all the spherical joints, $d_i^0 = (1\ 0\ 0)^T$, therefore $a_i$ is contained in the yz plane. That is, it is expressed as $a_i = (0\ a_y\ a_z)^T$. Therefore, the movable range becomes the cylindrical-shaped form having an axis parallel to $\alpha$ axis in the $(a_y, a_z, \alpha)$ space as shown in FIG. 6. $a_y$, $a_z$ and $\alpha$ are calculated as follows. Since $d_i^0 = (1\ 0\ 0)^T$, $d_i$ is as follows;

$$d_i = R_i d_i^0 \quad (24)$$
$$= (R_i(1,1)(R_i(2,1)R_i(3,1))^T.$$

Therefore, $a_y$ and $a_z$ are obtained as follows;

$$a_y = -\frac{R_i(3,1)}{\sqrt{2(1 + R_i(1,1))}} \text{ and} \quad (25)$$

$$a_z = \frac{R_i(2,1)}{\sqrt{2(1 + R_i(1,1))}} \quad (26)$$

Since the coordinate system after performing rotation around $a_i$ corresponds to the x axis of $R_i$, the twist angle $\alpha$ is obtained from the angles from the y axis and the z axis respectively. Although the equations (25) and (26) become a singular point when $\gamma_i = \pm\pi$, since it is usually out of the movable range, it does not become a problem in practice.

If the three parameters corresponding to a certain pose are obtained, then it decides whether it is within the movable range. It is efficiently calculable by expressing the movable range as a pillar-shaped polyhedron as shown in FIG. 6. In this embodiment, the movable range in the $a_y$-$a_z$ plane is expressed by a set of triangle, and the movable range of the twist angle $\alpha$ is expressed by the upper limit value and the lower limit value of each vertex of the triangle. For such a form, the decision whether it is within the movable range is performed as follows. First, if look for the triangle containing $(a_y, a_z, 0)$ and it is not found, it is decided that it is outside the movable range. If such a triangle is found, it decision whether $(a_y, a_z, \alpha)$ is between an upper limit and a lower limit. If it is found out that it is outside the movable range, the target joint velocity for returning it within the movable range is calculated. For the purpose, the standard pose $R_{si}$ is given previously to each spherical joint, and the target angular velocity $\omega_{Li}$ at which it towards to $R_{si}$ is calculated. This is performed by substituting $R_{si}$ into $R_{Di}$ of the equation (22) and $\omega_{Li}$ into $\omega^{Di}$ of the equation (23), respectively.

In the embodiments explained above, it is assumed that the position of the pin and the target joint value do not vary with time. However, it is easy to extend so that these time-varying may be included as described below. Thereby, the motion obtained with other means, such as motion capturing, can be edited on real time to generate a new motion. Following two are required for the extension.

(a) The position $r_{Fi}^{ref}$ and the velocity $\dot{r}_{Fi}^{ref}$ of the pin in the reference motion are obtained by the forward kinematics calculation, and a following equation is used instead of the equation (18).

$$\dot{r}_{Fi}^d = \dot{r}_{Fi}^{ref} + K_{Fi}(r_{Fi}^{ref} - r_{Fi}) \tag{27}$$

(b) The joint value and the joint velocity in the reference motion are used as the target joint value and the target joint velocity $\dot{\theta}_D^{ref}$, and a following equation is used instead of the equation (19).

$$\dot{\theta}_D^d = \dot{\theta}_D^{ref} + K_D(\theta_D^{ref} - \theta_D) \tag{28}$$

What is claimed is:

1. A method of generating poses and motions of a tree structure link system that is made by modeling of a man, animals, or robots, and consists of multiple links connected at joints, characterized in that by giving arbitrary numbers of constraint conditions to arbitrary numbers of arbitrary links, or by allowing adding or canceling the constraint conditions arbitrarily in the middle of the generation, the poses and the motions of the tree structure link system satisfying these constraint conditions are generated, the optimum pose is generated in consideration of all of the constraint conditions, and each priority is allocated to each constraint condition, the constraint condition having the high priority is satisfied strictly.

2. A method as claimed in claim 1, characterized in that the constraint conditions include the positions and poses of the links, and the velocities and angular velocities from which these change.

3. A method as claimed in claim 1, characterized in that the constraint conditions include that the joints do not exceed specified motion ranges respectively and the target velocity where the joint that exceeds a motion range returns within the motion range is considered one of the constraint conditions.

4. A method as claimed in claim 3, characterized in that the joints contain spherical joints with 3-degree of freedom, and the spherical joints are made not to exceed their motion ranges by using a method of expressing the motion ranges intuitively.

5. A method as claimed in claim 1, characterized in that the constraint conditions include that the joint value and the joint velocity of the joint with all or a part of degrees of freedom are approached the given target joint value and the given target joint velocity as much as possible and the target joint velocity is calculated based on an error from the target joint angle.

6. A method as claimed in claim 1, characterized in that the constraint conditions are realized by considering a restoring force depending on an error with an ideal state for each constraint condition.

7. A method as claimed in claim 1, characterized in that priorities are set to the constraint conditions respectively.

8. A method as claimed in claim 7, characterized in that an inverse kinetic calculation is used to generate the poses of the tree structure link system, the demand of strictness or the relief of strictness depending on the priority of the constraint conditions are permitted to the solution of the reverse kinematics calculation, and, a singular point low sensitivity motion decomposing method is used to solve the singular point problem of the solution.

* * * * *